(12) United States Patent
Lee et al.

(10) Patent No.: US 12,499,869 B2
(45) Date of Patent: Dec. 16, 2025

(54) SOUND SYNTHESIS METHOD, SOUND SYNTHESIS APPARATUS, AND RECORDING MEDIUM STORING INSTRUCTIONS TO PERFORM SOUND SYNTHESIS METHOD

(71) Applicant: Research & Business Foundation SUNGKYUNKWAN UNIVERSITY, Suwon-si (KR)

(72) Inventors: Suk Han Lee, Suwon-si (KR); Valero Puche, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 328 days.

(21) Appl. No.: 18/110,990

(22) Filed: Feb. 17, 2023

(65) Prior Publication Data
US 2023/0260503 A1    Aug. 17, 2023

(30) Foreign Application Priority Data
Feb. 17, 2022    (KR) .......................... 10-2022-0020569

(51) Int. Cl.
*G10L 13/047*  (2013.01)
*G10L 13/033*  (2013.01)
(Continued)

(52) U.S. Cl.
CPC ........ *G10L 13/047* (2013.01); *G10L 13/0335* (2013.01); *G10L 25/18* (2013.01); *G10L 25/30* (2013.01); *G10L 25/90* (2013.01)

(58) Field of Classification Search
None
See application file for complete search history.

(56) References Cited

U.S. PATENT DOCUMENTS

| | | | | |
|---|---|---|---|---|
| 7,842,874 B2 * | 11/2010 | Jehan | ................... | G10H 1/0025 84/634 |
| 10,068,557 B1 * | 9/2018 | Engel | ..................... | G06N 3/045 |

(Continued)

OTHER PUBLICATIONS

Luo, Yin-Jyun, et al., "Learning Disentangled Representations of Timbre and Pitch for Musical Instrument Sounds Using Gaussian Mixture Variational Autoencoders," arXiv: 1906.08152v2, Jun. 29, 2019, (8 Pages in English).

(Continued)

*Primary Examiner* — Daniel C Washburn
*Assistant Examiner* — Tyler Becker
(74) *Attorney, Agent, or Firm* — NSIP Law

(57) ABSTRACT

There is provided a sound synthesis apparatus. The apparatus comprises a transceiver configured to obtain a plurality of sound samples; and a processor, wherein the processor is configured to: preprocess each sound sample to convert each sound sample into a spectrogram; generate a plurality of latent codes by inputting the spectrogram of each sound sample to an encoder of an artificial neural network pre-trained to output a latent code that maximizes timbre information; generate one synthesized latent code by synthesizing the plurality of latent codes based on a weight present for each sound sample; and generate a synthesized sound by inputting the synthesized latent code to a decoder of the pre-trained artificial neural network.

15 Claims, 10 Drawing Sheets

(51) Int. Cl.
　　　*G10L 25/18*　　(2013.01)
　　　*G10L 25/30*　　(2013.01)
　　　*G10L 25/90*　　(2013.01)

(56) References Cited

U.S. PATENT DOCUMENTS

| | | | |
|---|---|---|---|
| 10,296,638 B1 * | 5/2019 | Chen | G06F 16/68 |
| 2018/0336880 A1 * | 11/2018 | Arik | G10L 25/30 |
| 2021/0280165 A1 * | 9/2021 | Yu | G10L 13/047 |
| 2021/0327460 A1 * | 10/2021 | Qian | G10L 25/30 |
| 2024/0155290 A1 * | 5/2024 | Hiroe | G10L 21/0308 |

OTHER PUBLICATIONS

Tanaka, Keitaro et al., "Pitch-Timbre Disentanglement of Musical Instrument Sounds Based on Vae-Based Metric Learning," IEEE International Conference on Acoustics, Speech, and Signal Processing, 2021, (pp. 111-115).

* cited by examiner

SOUND SYNTHESIS METHOD, SOUND SYNTHESIS APPARATUS, AND RECORDING MEDIUM STORING INSTRUCTIONS TO PERFORM SOUND SYNTHESIS METHOD

This work was supported by National Research Foundation of Korea (NRF) (Project No.: 2020R1A2C200956811; Government department: Ministry of Science and ICT; and Project Title: Deep Learning Based Cross-Sensory Transfer for Visually Impaired), by Institute of Information and Communication Technology Planning & Evaluation (IITP) (Project No.: IITP-2020-0-01821; Government department: Ministry of Science and ICT; and Project Title: ICT Consilience Program), and by Sungkyunkwan University (Granted No.: 2019-0-00421; and Project Title: Artificial Intelligence Graduate School Program).

TECHNICAL FIELD

The present disclosure relates to a sound synthesis method, a sound synthesis apparatus, a sound synthesis learning method, and a sound synthesis learning apparatus.

BACKGROUND

Research for synthesizing different sound samples using computer vision technology has been attempted. When two input signals (e.g., content and a style signal) are synthesized by a method for synthesizing different sound samples, it is capable to output information on the content and the style signal, but cause a problem in that audio properties are not well separated.

As a deep learning method for generating new sounds using an interpolation method, various autoencoder structures with pitch conditions have been researched. As an example of an autoencoder, there is a WaveNet-style autoencoder that separates timbre and pitch. The WaveNet-style autoencoder has a problem that timbre and pitch cannot be properly separated.

SUMMARY

As another example of an autoencoder, there is a Gaussian Mixture Variational Autoencoder (GMVAE) including dual encoders for inferring pitch and timbre codes. Also, there is a GANSynth (Adversarial Neural Audio Synthesis) method that can synthesize tones with high similarity and generate accurate pitches. However, the GANSynth method has a problem that it is difficult to select a desired tone because a tone to be synthesized is sampled from a random distribution.

An object of the present disclosure is to provide a sound synthesis method and apparatus capable of synthesizing and controlling a plurality of sounds.

However, the object of the present disclosure is not limited to the aforementioned one, and other objects that are not mentioned can be clearly understood by those skilled in the art from the description below.

In accordance with an aspect of the present disclosure, there is provided a sound synthesis apparatus, the apparatus may comprise: a transceiver configured to obtain a plurality of sound samples; and a processor, wherein the processor is configured to: preprocess each sound sample to convert each sound sample into a spectrogram; generate a plurality of latent codes by inputting the spectrogram of each sound sample to an encoder of an artificial neural network pre-trained to output a latent code that maximizes timbre information; generate one synthesized latent code by synthesizing the plurality of latent codes based on a weight present for each sound sample; and generate a synthesized sound by inputting the synthesized latent code to a decoder of the pre-trained artificial neural network.

The processor is configured to convert each sound sample into the spectrogram using a short-time Fourier transform (STFT).

The processor is configured to determine whether each sound sample is a single frame, if each sound sample is a single frame, obtain a spectrogram of a single time step corresponding to the single frame, obtained by preprocessing each sound sample, as the spectrogram, and if each sound sample is not a single frame, obtain an entire spectrogram obtained by preprocessing each sound sample as the spectrogram.

The encoder of the artificial neural network may include a fully connected layer when each sound sample is a single frame and includes a convolutional neural layer when each sound sample is not a single frame.

The pre-trained artificial neural network may include: a transceiver configured to obtain a plurality of training sound samples and training ground-truth pitch data of the plurality of training sound samples; a preprocessor configured to preprocess each sound sample to obtain a training spectrogram; an encoder unit configured to receive the training spectrogram to generate a training latent code; a first artificial neural network configured to receive the training latent code and to classify a timbre of each training sound sample; a second artificial neural network configured to receive the training latent code and to classify a pitch of each training sound sample; and a decoder unit configured to attach the training ground-truth pitch data of each training sound sample to the training latent code to convert the same into a training result spectrogram.

The encoder unit is configured to generate the training latent code such that an error in pitch classification based on pitches classified by the first artificial neural network is maximized and an error in timbre classification based on timbres classified by the second artificial neural network is minimized.

The processor is configured to add data corresponding to a preset pitch to the synthesized latent code through one-hot embedding to generate a pitch synthesized latent code and inputs the pitch synthesized latent code to the decoder of the pre-trained artificial neural network to generate the synthesized sound.

The plurality of sound samples includes at least one of a musical sound sample and a non-musical sound sample.

The processor is configured to input the synthesized latent code to the decoder of the pre-trained artificial neural network to obtain a synthesized spectrogram and convert the obtained synthesized spectrogram into sound data using a Griffin-Lim algorithm.

In accordance with another aspect of the present disclosure, there is provided a sound synthesis method performed by a sound synthesis apparatus including a transceiver and a processor, the method may comprise: obtaining a plurality of sound samples; preprocessing each sound sample to convert each sound sample into a spectrogram; generating a plurality of latent codes by inputting the spectrogram of each sound sample to an encoder of an artificial neural network pre-trained to output a latent code that maximizes timbre information; generating one synthesized latent code by synthesizing the plurality of latent codes based on a weight present for each sound sample; and generating a synthesized sound by inputting the synthesized latent code to a decoder of the pre-trained artificial neural network.

The preprocessing of each sound source to convert each sound sample into a spectrogram may include converting each sound sample into the spectrogram using a short-time Fourier transform (STFT).

The preprocessing of each sound sample to convert each sound sample into a spectrogram may include determining whether each sound sample is a single frame; if each sound sample is a single frame, obtaining a spectrogram of a single time step corresponding to the single frame, obtained by preprocessing each sound sample, as the spectrogram; and if each sound sample is not a single frame, obtaining an entire spectrogram obtained by preprocessing each sound sample as the spectrogram.

The encoder of the artificial neural network may include a fully connected layer when each sound sample is a single frame and includes a convolutional neural layer when each sound sample is not a single frame.

The pre-trained artificial neural network may include a first artificial neural network trained to classify a timbre of each training sound sample for a training latent code, and a second artificial neural network trained to classify a pitch of each training sound sample for the training latent code, and is trained to attach training ground-truth pitch data of each training sound sample to the training latent code to convert the same into a training result spectrogram and to generate the training latent code such that an error in pitch classification based on pitches classified by the first artificial neural network is maximized and an error in timbre classification based on timbres classified by the second artificial neural network is minimized.

The generating of one synthesized latent code by synthesizing the plurality of latent codes may include adding data corresponding to a preset pitch to the synthesized latent code through one-hot embedding to generate a pitch synthesized latent code, and the generating of a synthesized sound comprises inputting the pitch synthesized latent code to the decoder of the pre-trained artificial neural network to generate the synthesized sound.

The plurality of sound samples may include at least one of a musical sound sample and a non-musical sound sample.

The generating of a synthesized sound may include inputting the synthesized latent code to the decoder of the pre-trained artificial neural network to obtain a synthesized spectrogram and converting the obtained synthesized spectrogram into sound data using a Griffin-Lim algorithm.

In accordance with another aspect of the present disclosure, there is provided a sound synthesis method performed by a sound synthesis apparatus including a transceiver and a processor, the method may comprise: obtaining a plurality of sound samples; preprocessing each sound sample to convert each sound sample into a spectrogram; generating a plurality of latent codes by inputting the spectrogram of each sound sample to an encoder of an artificial neural network pre-trained to output a latent code that maximizes timbre information; generating one synthesized latent code by synthesizing the plurality of latent codes based on a weight present for each sound sample; and generating a synthesized sound by inputting the synthesized latent code to a decoder of the pre-trained artificial neural network.

In accordance with another aspect of the present disclosure, there is provided a non-transitory computer-readable storage medium including computer executable instructions, wherein the instructions, when executed by a processor, cause the processor to perform a sound synthesis method. The method comprises: obtaining a plurality of sound samples; preprocessing each sound sample to convert each sound sample into a spectrogram; generating a plurality of latent codes by inputting the spectrogram of each sound sample to an encoder of an artificial neural network pre-trained to output a latent code that maximizes timbre information; generating one synthesized latent code by synthesizing the plurality of latent codes based on a weight present for each sound sample; and generating a synthesized sound by inputting the synthesized latent code to a decoder of the pre-trained artificial neural network.

The preprocessing of each sound source to convert each sound sample into a spectrogram comprises converting each sound sample into the spectrogram using a short-time Fourier transform (STFT).

The preprocessing of each sound sample to convert each sound sample into a spectrogram comprises: determining whether each sound sample is a single frame; if each sound sample is a single frame, obtaining a spectrogram of a single time step corresponding to the single frame, obtained by preprocessing each sound sample, as the spectrogram; and if each sound sample is not a single frame, obtaining an entire spectrogram obtained by preprocessing each sound sample as the spectrogram.

The pre-trained artificial neural network includes a first artificial neural network trained to classify a timbre of each training sound sample for a training latent code, and a second artificial neural network trained to classify a pitch of each training sound sample for the training latent code, and is trained to attach training ground-truth pitch data of each training sound sample to the training latent code to convert the same into a training result spectrogram and to generate the training latent code such that an error in pitch classification based on pitches classified by the first artificial neural network is maximized and an error in timbre classification based on timbres classified by the second artificial neural network is minimized.

According to an embodiment of the present disclosure, timbre features of a plurality of sounds are extracted and a plurality of sounds can be synthesized according to a weight set by a user, and thus a framework for accurately searching for and generating a new musical instrument for composing synthesized music can be provided.

In addition, according to an embodiment of the present disclosure, a pitch desired by a user can be adjusted and thus can be used in an audio mixed reality application that can match any given environment.

DETAILED DESCRIPTION

Figure 1:
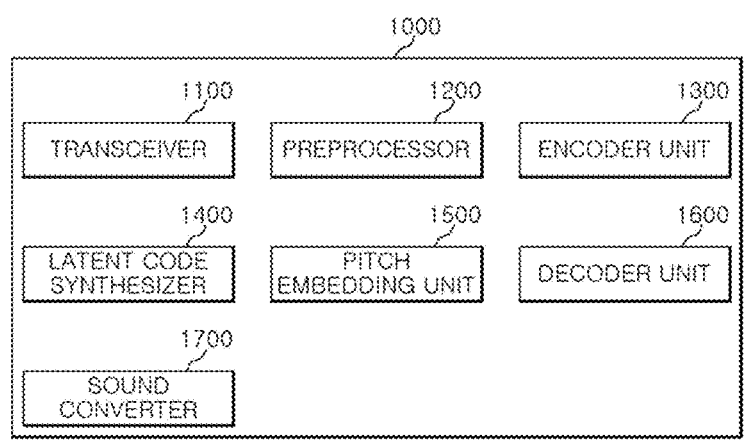
FIG. 1 is a block diagram illustrating a sound synthesis apparatus according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a block diagram illustrating a sound synthesis apparatus according to an embodiment of the present disclosure.

Referring to FIG. 1, the sound synthesis apparatus 1000 may include a transceiver 1100, a preprocessor 1200, an encoder unit 1300, a latent code synthesizer 1400, a pitch embedding unit 1500, a decoder unit 1600, and a sound converter 1700.

According to an embodiment, the sound synthesis apparatus 1000 may obtain a plurality of sound samples and synthesizes the plurality of sound samples using a pre-trained artificial neural network to maximize timbre features of the plurality of sound samples.

The pre-trained artificial neural network used by the speech synthesis apparatus 1000 may be an autoencoder including an encoder and a decoder.

Here, the autoencoder of the speech synthesis apparatus 1000 is a neural network that performs feature learning in the form of unsupervised learning for dimension reduction, and is an artificial neural network that encodes high-dimensional data into low-dimensional latent codes through dimension reduction by an encoder to derive latent features. In addition, the autoencoder can restore the dimension of the original data from the latent codes using a decoder.

In the speech synthesis apparatus 1000 according to the embodiment, since tones to be synthesized are randomly sampled by using an autoencoder, desired tones can be selected by inferring tones from input sound samples unlike a generative adversarial network (GAN) in which it is difficult to select desired tones.

In addition, the speech synthesis apparatus 1000 may include an artificial neural network pre-trained to output latent codes that maximize timbre information from a spectrogram of a sound sample.

The transceiver 1100 may acquire a plurality of sound samples from an external device distinguished from the speech synthesis apparatus 1000 or a storage device of the speech synthesis apparatus 1000. The transceiver 1100 may obtain a plurality of sound samples using wireless or/and wired communication when obtaining the plurality of sound samples from an external device and may obtain a plurality of sound samples through internal signaling when obtaining the plurality of sound samples from an internal storage device. A method of obtaining a plurality of sound samples by the transceiver 1100 is not limited thereto.

Here, the plurality of sound samples obtained by the transceiver 1100 may include pitches and timbres. Further, the plurality of sound samples may include single-frame samples or multi-frame samples having a predefined length.

Further, the plurality of sound samples obtained by the transceiver 1100 may include at least one of a musical sound sample and a non-musical sound sample. Accordingly, the speech synthesis apparatus 1000 may synthesize a plurality of input sound samples into one sound regardless of whether they are musical sound samples or non-musical sound samples.

Figure 2:
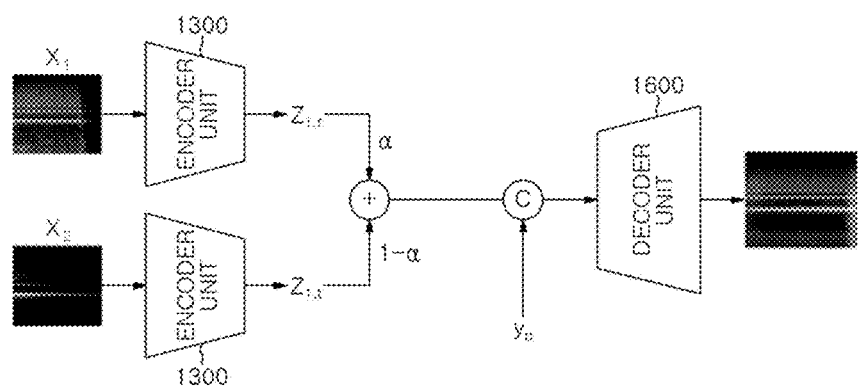
FIG. 2 is a block diagram illustrating a speech synthesis learning apparatus according to an embodiment of the present disclosure.

FIG. 2 is a block diagram illustrating a sound synthesis process according to an embodiment of the present disclosure.

The preprocessor 1200 may preprocess a plurality of input sound samples to convert them into a spectrogram. Here, the spectrogram refers to a graph that represents the magnitude of sound as a color gradation by setting the magnitude of a frequency spectrum component, such as a voice, as a function of frequency and time. The y-axis of the spectrogram represents frequency, and the x-axis represents time.

The preprocessor 1200 may convert sound samples into a spectrogram using a short-time Fourier transform (STFT). STFT is a method of determining the frequency and phase of a sine wave by Fourier transform for a local window of a signal over time. Since the STFT is well-known, a detailed description thereof will be omitted.

For example, the preprocessor may convert two input sound samples into a first spectrogram $X_1$ and a second spectrogram $X_2$ using STFT.

In addition, the preprocessor 1200 may determine whether each sound sample is a single frame, obtain a spectrogram of a single time step corresponding to a single frame, obtained by preprocessing each sound sample, as the spectrogram if each sound sample is a single frame, and obtain an entire spectrogram obtained by preprocessing each sound sample as the spectrogram if each of the plurality of sound samples is not a single frame.

The encoder unit 1300 of the artificial neural network may include a fully connected layer if each sound sample is a single frame and may include a convolutional neural layer if each sound sample is not a single frame.

The encoder unit 1300 may include an encoder trained by a learning method which will be described later. The encoder may be an encoder of an artificial neural network pre-trained to output latent codes that maximize timbre information. Further, the encoder of the encoder unit 1300 performs a function of an encoder of the above-described autoencoder.

For example, the encoder unit 1300 may receive the converted first spectrogram $X_1$ and second spectrogram $X_2$ as inputs and generate a first latent code $Z_{1,t}$ and a second latent code $Z_{2,t}$ in which information on timbres is maximized.

The latent code synthesizer 1400 may synthesize a plurality of latent codes generated by the encoder unit 1300 into one latent code. In this case, the latent code synthesizer 1400 may generate one synthesized latent code by synthesizing the plurality of latent codes based on a weight preset for each sound sample. Here, the weight means a value between 0 and 1 that can represent a mixing percentage of each sample.

For example, the latent code synthesizer 1400 may generate one latent code by adding a value obtained by multiplying the first latent code $Z_{1,t}$ by a preset weight a to a value obtained by multiplying the second latent code $Z_{2,t}$ by a preset weight 1−α. Here, as the weight a increases, the generated latent code can include more timbre information of the first latent code $Z_{1,t}$ than that of the second latent code $Z_{2,t}$.

The pitch embedding unit 1500 can freely set the pitch $y_p$ of an output sample according to user input or a parameter previously set by the user. Here, all pitches set in a learning process which will be described later may be used as pitches that can be set by the user. More specifically, the pitch embedding unit 1500 may generate a pitch synthesis latent code by adding data corresponding to a preset pitch to the synthesized latent code through one-hot embedding.

The decoder unit 1600 performs the above-described decoder function of the autoencoder, may include a decoder of an artificial neural network, and may convert the generated latent code into a spectrogram.

The sound converter 1700 may convert the spectrogram converted by the decoder unit 1600 into sound data. The sound converter 1700 may use a Griffin-Lim algorithm in order to convert the spectrogram into sound data. Since the Griffin-Lim algorithm is a known technique, a detailed description thereof will be omitted.

The sound synthesis apparatus 1000 according to an embodiment of the present disclosure has been described. Hereinafter, a speech synthesis learning apparatus for learning an artificial neural network of the speech synthesis apparatus 1000 according to another embodiment of the present disclosure will be described in detail.

Figure 3:
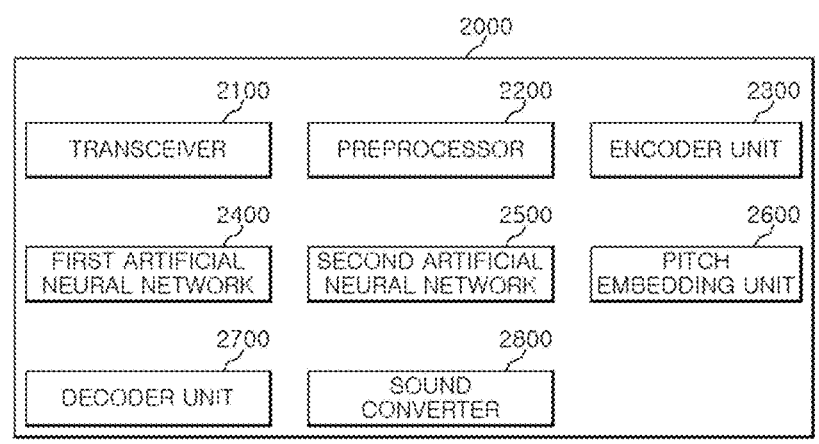
FIG. 3 is a block diagram illustrating a sound synthesis learning process according to an embodiment of the present disclosure.

FIG. 3 is a block diagram illustrating a speech synthesis learning apparatus according to an embodiment of the present disclosure.

Referring further to FIG. 3, the speech synthesis learning apparatus 2000 may include a transceiver 2100, a preprocessor 2200, an encoder unit 2300, a first artificial neural network 2400, a second artificial neural network 2500, a pitch embedding unit 2600, a decoder unit 2700, and a sound converter 2800.

The speech synthesis learning apparatus 2000 may train an artificial neural network included in the speech synthesis apparatus 1000 using a plurality of training sound samples and training ground-truth pitch data of the training sound samples.

The transceiver 2100 may obtain a plurality of training pitch samples and training ground-truth pitch data of the training sound samples. Since the method in which the transceiver 2100 of the speech synthesis learning apparatus 2000 obtains samples and data is the same as the method in which the transceiver 1100 of the speech synthesis apparatus 1000 obtains samples and data, a detailed description thereof will be omitted.

Figure 4:
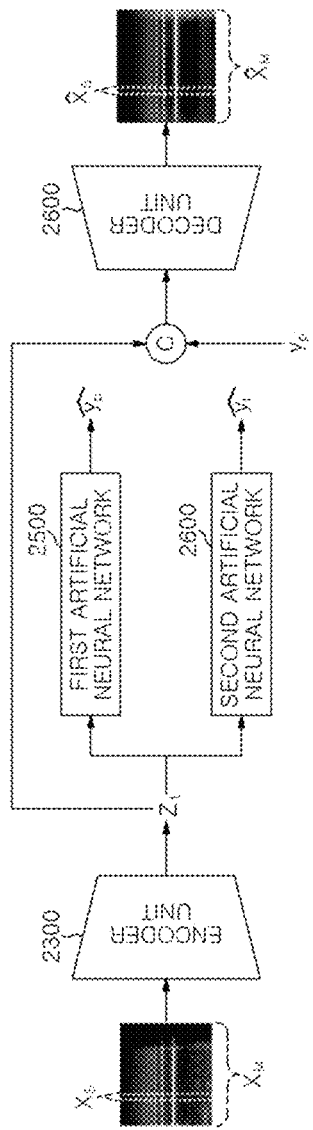
FIG. 4 is a block diagram illustrating a sound synthesis process according to an embodiment of the present disclosure.

FIG. 4 is a block diagram illustrating a speech synthesis learning process according to an embodiment of the present disclosure.

Referring further to FIG. 4, the preprocessor 2200 of FIG. 3 may preprocess a plurality of input training sound samples to convert them into a spectrogram. Here, the spectrogram refers to a graph that represents the magnitude of sound as a color gradation by setting the magnitude of a frequency spectrum component, such as a voice, as a function of frequency and time. The y-axis of the spectrogram represents frequency, and the x-axis represents time.

The preprocessor 2200 of FIG. 3 may convert the training sound samples into a spectrogram using short-time Fourier transform (STFT). STFT is a method of determining the frequency and phase of a sine wave by Fourier transform for a local window of a signal over time. Since the STFT is well-known, a detailed description thereof will be omitted.

In addition, the preprocessor 2200 of FIG. 3 may determine whether each training sound sample is a single frame, obtain a spectrogram of a single time step corresponding to a single frame, obtained by preprocessing each training sound sample, as the spectrogram if each training sound sample is a single frame, and obtain an entire spectrogram obtained by preprocessing each training sound sample as the spectrogram if each of the plurality of training sound samples is not a single frame.

In addition, the encoder unit 2300 of the artificial neural network may include a fully connected layer if each training sound sample is a single frame and include a convolutional neural layer if each training sound sample is not a single frame.

For example, when training sound samples constitute multiple frames $X_M$ including a plurality of frames $X_s$, multiple time steps may be considered for the entire multiple frames $X_M$, and in this case, the encoder unit 2300 may include a convolutional neural network suitable for image processing.

The encoder unit 2300 may receive the spectrogram and generate a latent code $Z_t$. In addition, the encoder unit 2300 may generate the latent code Z that maximizes timbre information and minimizes pitch information by being connected to the first artificial neural network 2400 and the second artificial neural network 2500 which will be described later and trained.

The first artificial neural network 2400 and the second artificial neural network 2500 are not used in the sound synthesis apparatus 1000 of FIG. 1 and are used only in the sound synthesis learning apparatus 2000 in FIG. 3 and may classify pitches and timbres for the input training spectrogram.

According to an embodiment, the first artificial neural network 2400 includes a fully-connected layer. In addition, although the first artificial neural network 2400 outputs a first prediction result $\hat{y}_p$ in which pitch classification has been accurately predicted for the generated latent code $Z_t$, the encoder unit 2300 connected to the first artificial neural network 2400 is adversarially trained such that error in pitch classification is maximized in the second artificial neural network 2500 for the generated latent code $Z_t$.

According to an embodiment, the second artificial neural network 2500 includes a fully-connected layer. In addition, the second artificial neural network 2500 outputs a second prediction result $\hat{y}_t$ in which timbre classification has been accurately predicted for the generated latent code $Z_t$, and the encoder unit 2300 connected to the second artificial neural network 2500 is trained such that error in timbre classification is minimized in the second artificial neural network 2500 for the generated latent code $Z_t$.

That is, the latent code $Z_t$ generated by the encoder unit 2300 can be trained such that timbre information of training sound samples is maximized and pitch information of the training sound samples is minimized.

The pitch embedding unit 2600 may attach the obtained training ground-truth pitch data $y_p$ to the generated latent code $Z_t$. Here, the training ground-truth pitch data $y_p$ may be converted through one-hot embedding and attached to the latent code $Z_t$.

Since the decoder unit 2700 and the sound converter 2800 of FIG. 3 perform the same functions as those of the decoder unit 1600 and the sound converter 1700 of the sound synthesis apparatus 1000 of FIG. 1, a detailed description thereof will be omitted.

Figure 5:
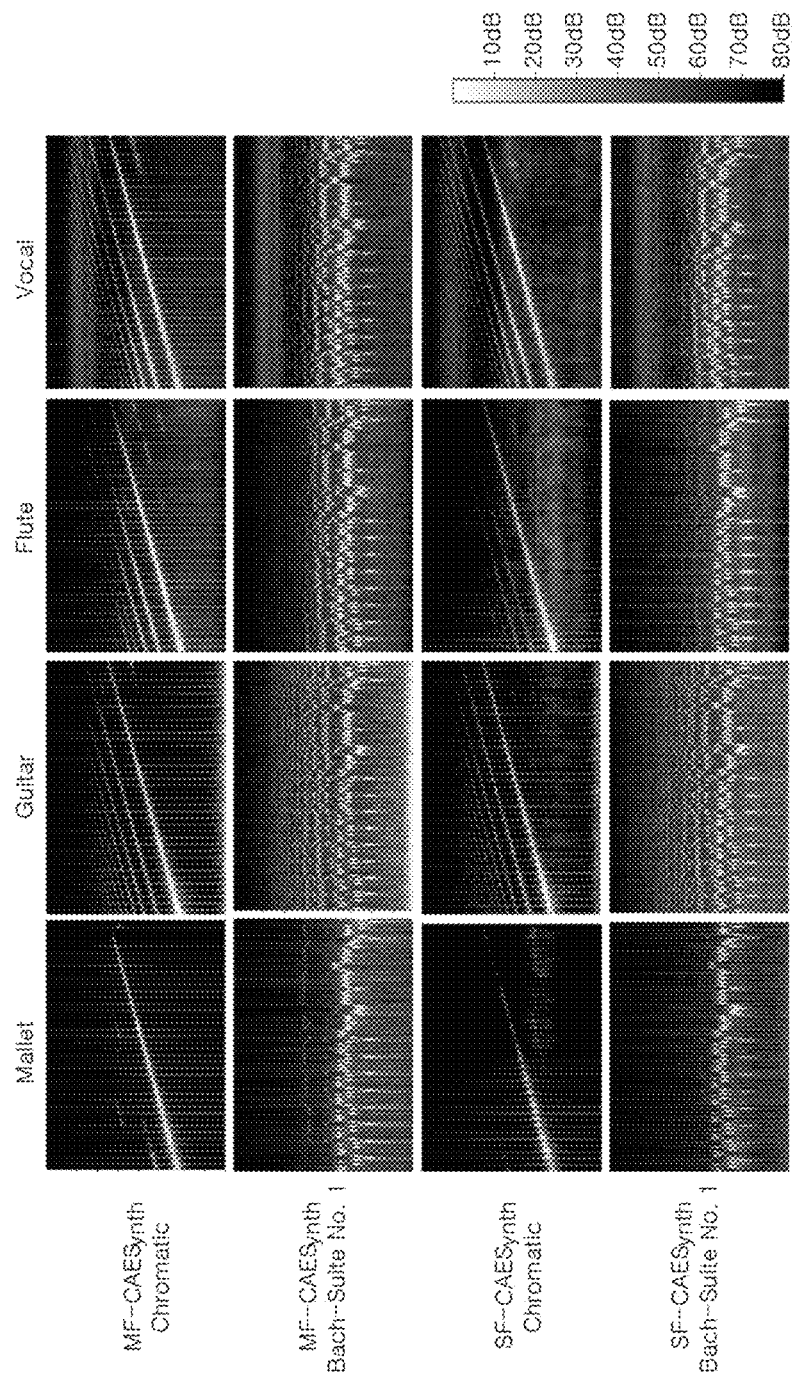
FIG. 5 shows results of controlling pitches of sounds synthesized from two melodies using the sound synthesis apparatus for different musical instruments according to an embodiment of the present disclosure.

FIG. 5 shows results of controlling pitches of sounds synthesized from two melodies using the sound synthesis apparatus for different musical instruments according to an embodiment of the present disclosure.

Referring to FIG. 5, spectrograms of chromatic and Bach-Suite No. 1 G Major, synthesized by the sound synthesis apparatus 1000 of FIG. 1 for a mallet, a guitar, a flute, and a voice having different timbres, for a multi-frame MF-CAESynth and single frame SF-CAESynth can be confirmed.

Synthesis results MF-CAESynth Chromatic and SF-CAESynth Chromatic of chromatic scales show spectrograms synthesized while increasing a pitch level by one step, and synthesis results MF-CAESynth Bach-Suite No. 1 G Major and SF-CAESynth Bach-Suite No. 1 G Major of Bach-suite No. 1 G major show spectrograms synthesized according to the tempo and pitch of the original music.

It can be ascertained from the synthesized spectrograms that the sound synthesis apparatus 1000 of FIG. 1 according to an embodiment of the present disclosure can obtain a synthesis result for a desired pitch while maintaining a constant timbre.

In addition, it can be ascertained from the synthesized spectrograms that synthesis results for desired pitches can be obtained while maintaining the timbre constant in both single frame and multi-frame solutions for each musical instrument.

Figure 6:
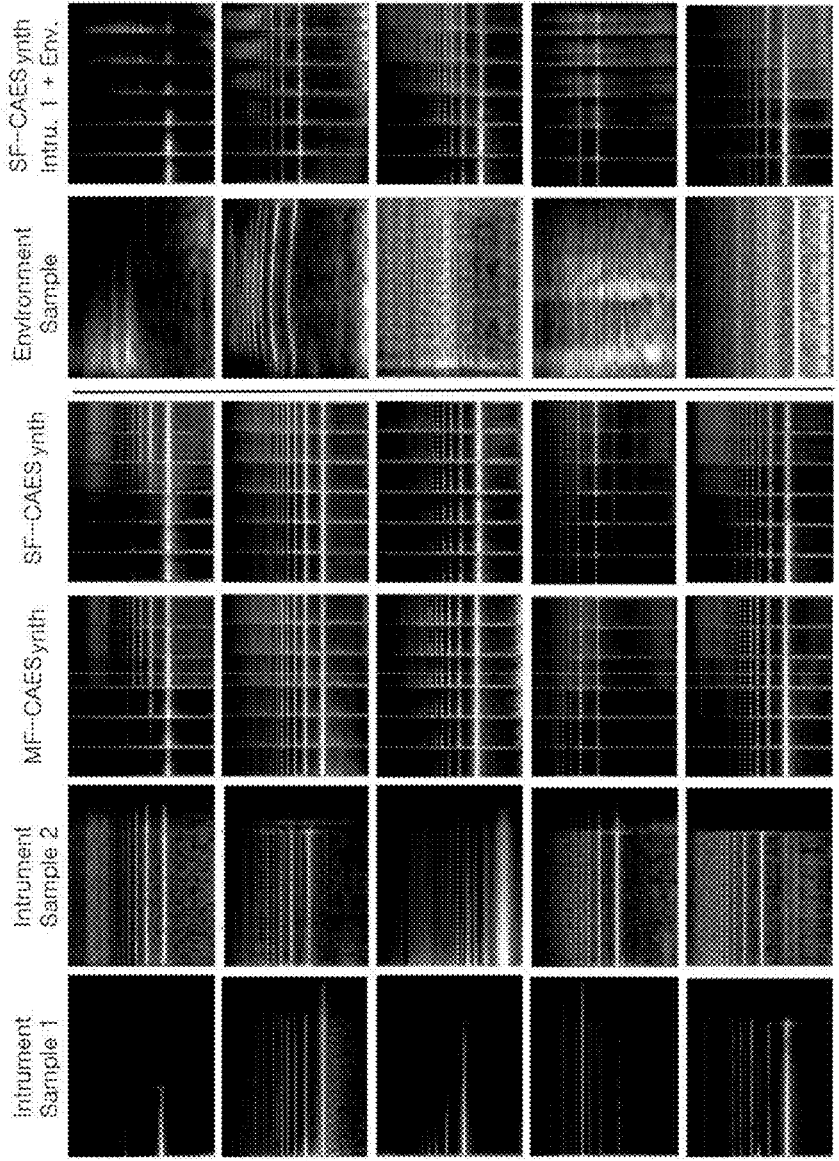
FIG. 6 shows results of sound synthesis by varying weights for two sounds according to an embodiment of the present disclosure.

FIG. 6 shows results of sound synthesis by varying weights for two sounds according to an embodiment of the present disclosure.

Referring to FIG. 6, when weights are adjusted from 0 to 1 for a first sound sample Instrument Sample 1 and a second sample Instrument Sample 2, which are musical sound samples, multi-frame synthesis resultant spectrograms MF-CAESynth and single-frame synthesis result spectrograms SF-CAESynth can be confirmed. It can be ascertained from the synthesis result spectrograms that the timbre of each of the first and second sound samples smoothly switches from the first sound sample to the second sound sample according to a set weight, and the pitch is maintained constant.

In addition, the same effects can also be confirmed when weights are adjusted from 0 to 1 for the first sound sample, which is a musical sound sample, and an environment sample, which is a non-musical sound sample. That is, the sound synthesis apparatus 1000 of FIG. 1 according to an embodiment of the present disclosure can effectively synthesize not only musical timbres but also non-musical timbres.

Figure 7:
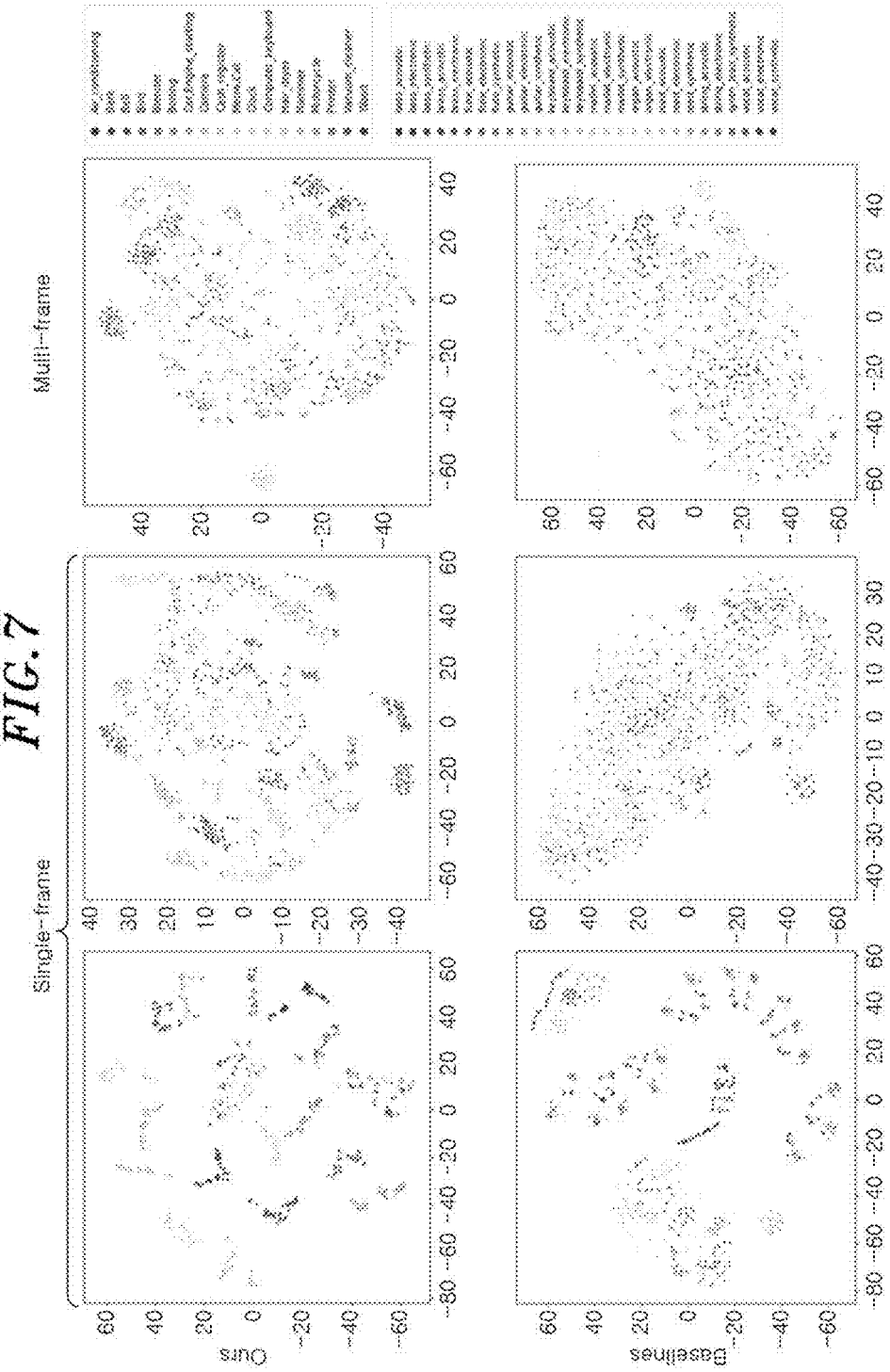
FIG. 7 shows visualization of latent codes projected on a two-dimensional space by an encoder according to an embodiment of the present disclosure.

FIG. 7 shows visualization of latent codes projected on a two-dimensional space by an encoder according to an embodiment of the present disclosure.

Referring to FIG. 7, the dimension of a generated latent code has been reduced through a T-distributed stochastic neighbor embedding algorithm, and the sound synthesis apparatus 1000 (Ours) of FIG. 1 and the conventional WaveNet-style Autoencoder and conditioning autoencoder (Baselines) are shown. It can be ascertained from the distributions shown in the graphs that timbre clusters are arranged better in a latent space when the sound synthesis apparatus 1000 (Ours) of FIG. 1 sums musical sound samples and non-musical sound samples in both a single frame and a multi-frame.

In the above-described embodiment of the present disclosure, the transceiver 1100, the preprocessor 1200, the encoder unit 1300, the latent code synthesizer 1400, the pitch embedding unit 1500, the decoder unit 1600, and the sound converter 1700 shown in FIG. 1, and the transceiver 2100, the preprocessor 2200, the encoder unit 2300, the first artificial neural network 2400, the second artificial neural network 2500, and the decoder unit 2700 shown in FIG. 3 may be implemented by hardware, firmware, software, or a combination thereof.

For example, the transceiver 1100 of FIG. 1 and the transceiver 2100 of FIG. 3 may be implemented by a communication interface device capable of performing wireless communication using 3G, 4G, 5G, 6G, or LTE, and the preprocessor 1200, the encoder unit 1300, the latent code synthesizer 1400, the pitch embedding unit 1500, the decoder unit 1600, and the sound converter 1700 shown in FIG. 1 and the preprocessor 2200, the encoder unit 2300, the first artificial neural network 2400, the second artificial neural network 2500, and the decoder unit 2700 shown in FIG. 3 may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementation by firmware or software, a method according to embodiments of the present disclosure may be implemented in the form of a module, a procedure, or a function that performs the functions or operations described above. Software code may be stored in a memory unit and driven by a processor. The memory unit may be located inside or outside the processor and exchange data with the processor by various means known in the art.

Figure 8:
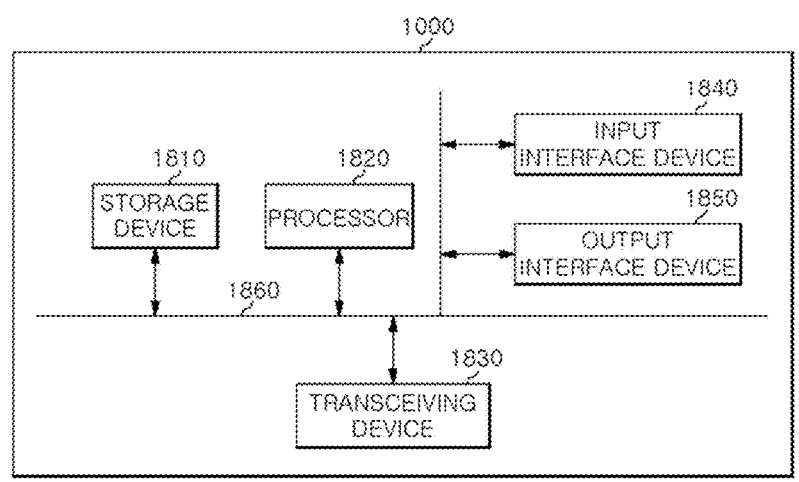
FIG. 8 is a block diagram illustrating the sound synthesis apparatus according to an embodiment of the present disclosure from a hardware point of view.

FIG. 8 is a block diagram illustrating the sound synthesis apparatus according to an embodiment of the present disclosure from a hardware point of view.

Referring to FIG. 1 and FIG. 8, the sound synthesis apparatus 1000 may include a storage device 1810 for storing at least one command, a processor 1820 for executing at least one command stored in the storage device 1810, a transceiving device 1830, an input interface device 1840, and an output interface device 1850.

The components 1810, 1820, 1830, 1840, and 1850 included in the sound synthesis apparatus 1000 may be connected by a data bus 1860 such that they communicate with each other.

The storage device 1810 may include at least one of a memory or a volatile storage medium and a non-volatile storage medium. For example, the storage device 1810 may include at least one of a read only memory (ROM) and a random access memory (RAM).

The storage device 1810 may further include at least one command to be executed by the processor 1820 which will be described later and may store pitches, frame lengths, and the like input from a user through the input interface device 1840.

The processor 1820 may refer to a central processing unit (CPU), a graphics processing unit (GPU), a micro controller unit (MCU), or a dedicated processor which performs methods according to embodiments of the present disclosure.

As described above, the processor 1820 may execute the functions of the preprocessor 1200, the encoder unit 1300, the latent code synthesizer 1400, the pitch embedding unit 1500, the decoder unit 1600, and the sound converter 1700 according to at least one program command stored in the storage device 1810, and each of these components may be stored in a memory in the form of at least one module and executed by the processor.

The transceiving device 1830 may receive/transmit data from/to an internal device or an external device connected through communication, and may perform the function of the transceiver 1100.

The input interface device 1840 may receive at least one control signal or set value from a user. For example, the input interface device 1840 may receive a pitch, a frame length, a weight of each sample, and the like and may update input values and information.

The output interface device 1850 may output and visualize at least one piece of information including a spectrogram of a sound synthesized by the operation of the processor 1820 and set weights.

The sound synthesis apparatus 1000 and the sound synthesis learning apparatus 2000 according to an embodiment of the present disclosure have been described above. Hereinafter, a sound synthesis method and a sound synthesis learning method according to another aspect of the present disclosure executed by the operations of the processors in the sound synthesis apparatus 1000 and the sound synthesis learning apparatus 2000 will be described.

Figure 9:
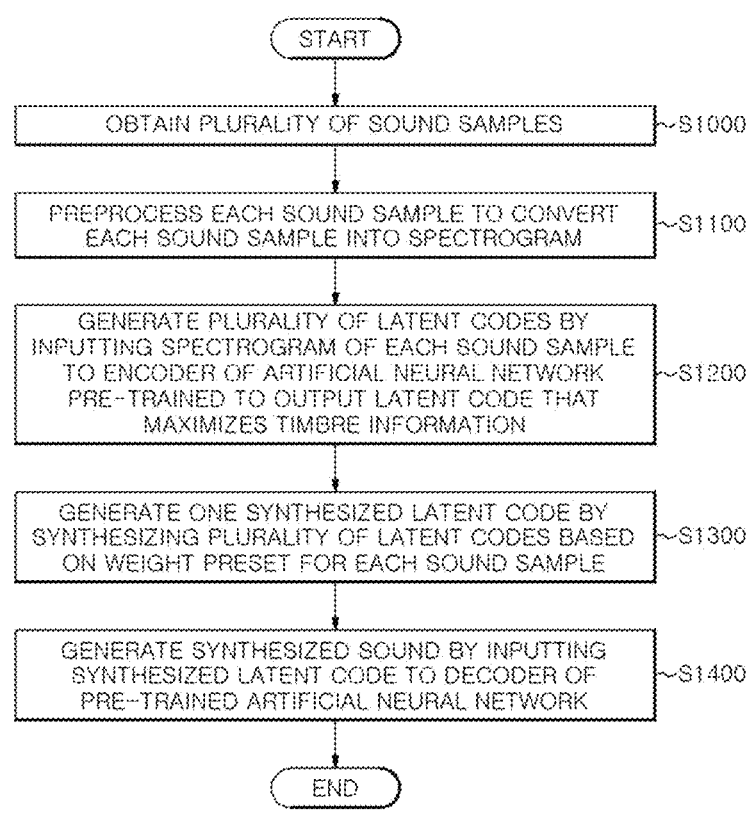
FIG. 9 is a flowchart of a sound synthesis method according to another aspect of the present disclosure.

FIG. 9 is a flowchart of a sound synthesis method according to another aspect of the present disclosure.

Referring to FIG. 1 and FIG. 9, first, the sound synthesis apparatus 1000 may obtain a plurality of sound samples (S1000).

Next, the sound synthesis apparatus 1000 may preprocess each sound sample to convert the same into a spectrogram (S1100).

In addition, the sound synthesis apparatus 1000 may generate a plurality of latent codes by inputting the spectrogram of each sound sample to an encoder of an artificial neural network pre-trained to output a latent code in which timbre information is maximized (S1200).

The sound synthesis apparatus 1000 may generate a synthesized latent code by synthesizing a plurality of latent codes based on a weight preset for each sound sample (S1300).

Finally, the sound synthesis apparatus 1000 may generate a synthesized sound by inputting the synthesized latent code to a decoder of the pre-trained artificial neural network (S1400).

Figure 10:
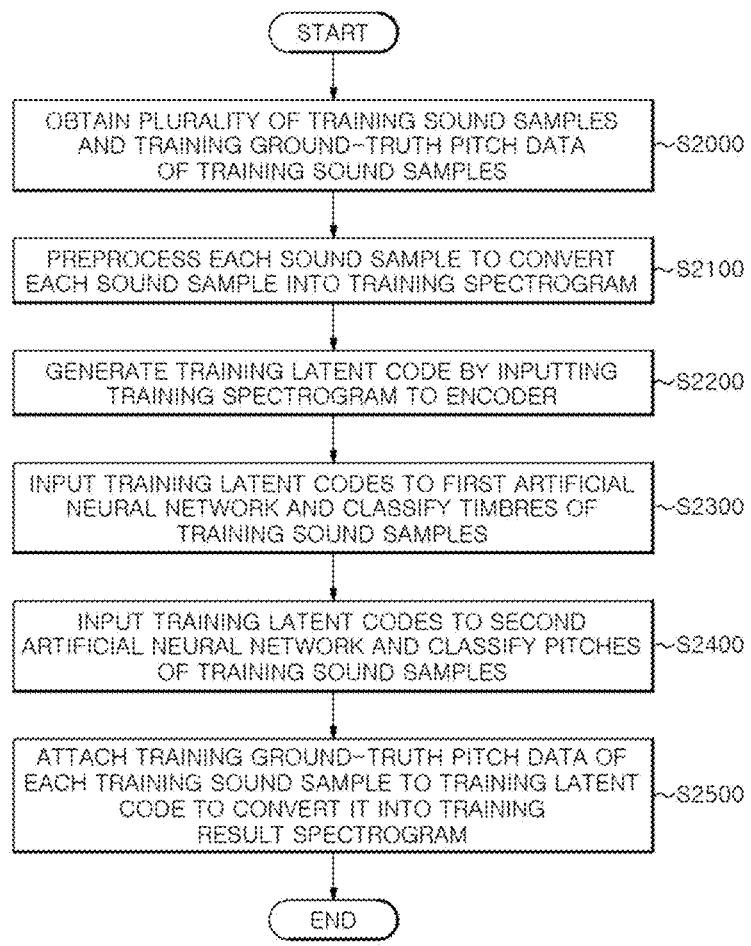
FIG. 10 is a flowchart of a speech synthesis learning method according to another aspect of the present disclosure.

FIG. 10 is a flowchart of a sound synthesis learning method according to another aspect of the present disclosure.

Referring to FIG. 3 and FIG. 10, the sound synthesis learning apparatus 2000 may obtain a plurality of training sound samples and training ground-truth pitch data of the plurality of training sound samples (S2000).

The sound synthesis learning apparatus 2000 may preprocess each sound sample to convert the same into a training spectrogram (S2100) and input the converted training spectrogram to an encoder to generate a training latent code (S2200).

In addition, the sound synthesis learning apparatus 2000 may classify timbres of the training sound samples by inputting the training latent codes to the first artificial neural network (S2300) and classify pitches of the training sound samples by inputting the training latent codes to the second artificial neural network (S2400).

The sound synthesis learning apparatus 2000 may attach the training ground-truth pitch data of each training sound sample to the training latent code to convert the same into a training resultant spectrogram (S2500).

Here, the encoder may be trained to generate the training latent codes such that error in pitch classification is maximized based on pitches classified by the first artificial neural network and error in timbre classification is minimized based on timbres classified by the second artificial neural network.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A sound synthesis apparatus comprising:
   a transceiver configured to obtain a plurality of sound samples; and
   a processor,
   wherein the processor is configured to:
   preprocess each sound sample to convert each sound sample into a spectrogram;
   determine whether each sound sample corresponds to a single-frame or multi-frame input and, based thereon, selectively input the spectrogram to either a fully connected encoder layer if each sound sample corresponds to the single-frame or a convolutional encoder layer if each sound sample corresponds to the multi-frame;
   generate a plurality of latent codes by inputting the spectrogram of each sound sample to an encoder of an artificial neural network pre-trained to output a latent code that maximizes timbre information;
   generate one synthesized latent code by synthesizing the plurality of latent codes based on a weight present for each sound sample; and
   generate a synthesized sound by inputting the synthesized latent code to a decoder of the pre-trained artificial neural network.

2. The sound synthesis apparatus of claim 1, wherein the processor converts each sound sample into the spectrogram using a short-time Fourier transform (STFT).

3. The sound synthesis apparatus of claim 1, wherein the pre-trained artificial neural network includes:
   a transceiver configured to obtain a plurality of training sound samples and training ground-truth pitch data of the plurality of training sound samples;
   a preprocessor configured to preprocess each sound sample to obtain a training spectrogram;
   an encoder unit configured to receive the training spectrogram to generate a training latent code;
   a first artificial neural network configured to receive the training latent code and to classify a timbre of each training sound sample;
   a second artificial neural network configured to receive the training latent code and to classify a pitch of each training sound sample; and
   a decoder unit configured to attach the training ground-truth pitch data of each training sound sample to the training latent code to convert the same into a training result spectrogram,
   wherein the encoder unit generates the training latent code such that an error in pitch classification based on pitches classified by the first artificial neural network is maximized and an error in timbre classification based on timbres classified by the second artificial neural network is minimized.

4. The sound synthesis apparatus of claim 1, wherein the processor is configured to add data corresponding to a preset pitch to the synthesized latent code through one-hot embedding to generate a pitch synthesized latent code and inputs the pitch synthesized latent code to the decoder of the pre-trained artificial neural network to generate the synthesized sound.

5. The sound synthesis apparatus of claim 1, wherein the plurality of sound samples includes at least one of a musical sound sample and a non-musical sound sample.

6. The sound synthesis apparatus of claim 1, wherein the processor is configured to input the synthesized latent code to the decoder of the pre-trained artificial neural network to obtain a synthesized spectrogram and convert the obtained synthesized spectrogram into sound data using a Griffin-Lim algorithm.

7. A sound synthesis method performed by a sound synthesis apparatus including a transceiver and a processor, comprising:
   obtaining a plurality of sound samples;
   preprocessing each sound sample to convert each sound sample into a spectrogram;
   determining whether each sound sample corresponds to a single-frame or multi-frame input and, based thereon, selectively inputting the spectrogram to either a fully connected encoder layer if each sound sample corresponds to the single-frame or a convolutional encoder layer if each sound sample corresponds to the multi-frame;
   generating a plurality of latent codes by inputting the spectrogram of each sound sample to an encoder of an artificial neural network pre-trained to output a latent code that maximizes timbre information;
   generating one synthesized latent code by synthesizing the plurality of latent codes based on a weight present for each sound sample; and
   generating a synthesized sound by inputting the synthesized latent code to a decoder of the pre-trained artificial neural network.

8. The sound synthesis method of claim 7, wherein the preprocessing of each sound source to convert each sound sample into a spectrogram comprises converting each sound sample into the spectrogram using a short-time Fourier transform (STFT).

9. The sound synthesis method of claim 7, wherein the pre-trained artificial neural network includes a first artificial neural network trained to classify a timbre of each training sound sample for a training latent code, and a second artificial neural network trained to classify a pitch of each training sound sample for the training latent code, and
   wherein the pre-trained artificial neural network is configured to attach training ground-truth pitch data of each training sound sample to the training latent code to convert the same into a training result spectrogram, and to be trained to generate the training latent code such that an error in pitch classification based on pitches classified by the first artificial neural network is maximized and an error in timbre classification based on timbres classified by the second artificial neural network is minimized.

10. The sound synthesis method of claim 7, wherein the generating of one synthesized latent code comprises adding data corresponding to a preset pitch to the synthesized latent code through one-hot embedding to generate a pitch synthesized latent code, and
wherein the generating of a synthesized sound comprises inputting the pitch synthesized latent code to the decoder of the pre-trained artificial neural network to generate the synthesized sound.

11. The sound synthesis method of claim 7, wherein the plurality of sound samples includes at least one of a musical sound sample and a non-musical sound sample.

12. The sound synthesis method of claim 7, wherein the generating of a synthesized sound comprises inputting the synthesized latent code to the decoder of the pre-trained artificial neural network to obtain a synthesized spectrogram and converting the obtained synthesized spectrogram into sound data using a Griffin-Lim algorithm.

13. A computer-readable recording medium storing a computer program including commands for causing a processor to perform a method comprising:
obtaining a plurality of sound samples;
preprocessing each sound sample to convert each sound sample into a spectrogram;
determining whether each sound sample corresponds to a single-frame or multi-frame input and, based thereon, selectively inputting the spectrogram to either a fully connected encoder layer if each sound sample corresponds to the single-frame or a convolutional encoder layer if each sound sample corresponds to the multi-frame;
generating a plurality of latent codes by inputting the spectrogram of each sound sample to an encoder of an artificial neural network pre-trained to output a latent code that maximizes timbre information;
generating one synthesized latent code by synthesizing the plurality of latent codes based on a weight present for each sound sample; and
generating a synthesized sound by inputting the synthesized latent code to a decoder of the pre-trained artificial neural network.

14. The computer-readable recording medium of claim 13, wherein the preprocessing of each sound source to convert each sound sample into a spectrogram comprises converting each sound sample into the spectrogram using a short-time Fourier transform (STFT).

15. The computer-readable recording medium of claim 13, wherein the pre-trained artificial neural network includes a first artificial neural network trained to classify a timbre of each training sound sample for a training latent code, and a second artificial neural network trained to classify a pitch of each training sound sample for the training latent code, and
wherein the pre-trained artificial neural network is configured to attach training ground-truth pitch data of each training sound sample to the training latent code to convert the same into a training result spectrogram, and to be trained to generate the training latent code such that an error in pitch classification based on pitches classified by the first artificial neural network is maximized and an error in timbre classification based on timbres classified by the second artificial neural network is minimized.

* * * * *